(12) United States Patent
Simpson et al.

(10) Patent No.: US 11,599,125 B2
(45) Date of Patent: Mar. 7, 2023

(54) APPARATUS AND METHODS FOR MONITORING AUTONOMOUS VEHICLES

(71) Applicant: c/o Toyota Material Handling, Inc., Columbus, IN (US)

(72) Inventors: Anthony Brian Simpson, Columbus, IN (US); Jesse Weisberg, Columbus, IN (US); Samuel Mitchell, Columbus, IN (US); Mustafa Parlaktuna, Indianapolis, IN (US); Joshua G. Linnemann, Columbus, IN (US)

(73) Assignee: Toyota Material Handling, Inc., Columbus, IN (US)

( * ) Notice: Subject to any disclaimer, the term of this patent is extended or adjusted under 35 U.S.C. 154(b) by 233 days.

(21) Appl. No.: 17/034,365

(22) Filed: Sep. 28, 2020

(65) Prior Publication Data

US 2021/0096581 A1    Apr. 1, 2021

Related U.S. Application Data

(60) Provisional application No. 62/907,933, filed on Sep. 30, 2019.

(51) Int. Cl.
    *G05D 1/02*    (2020.01)
    *G05D 1/00*    (2006.01)

(52) U.S. Cl.
    CPC ......... *G05D 1/0291* (2013.01); *G05D 1/0016* (2013.01); *G05D 1/0022* (2013.01); *G05D 1/0038* (2013.01); *G05D 1/0088* (2013.01); *G05D 1/0246* (2013.01)

(58) Field of Classification Search
    CPC .. G05D 1/0291; G05D 1/0016; G05D 1/0022; G05D 1/0038; G05D 1/0088; G05D 1/0246; G05D 2201/0216; G05D 1/0287; G05D 1/00; G05D 1/0033; G05D 1/0011–005
    See application file for complete search history.

(56) References Cited

U.S. PATENT DOCUMENTS

| | | | | |
|---|---|---|---|---|
| 9,864,371 | B2* | 1/2018 | Douglas | G05D 1/0282 |
| 2015/0346722 | A1* | 12/2015 | Herz | G01S 19/13 |
| | | | | 701/2 |
| 2016/0259330 | A1* | 9/2016 | Lacaze | G05D 1/0016 |
| 2017/0192423 | A1* | 7/2017 | Rust | G05D 1/0238 |
| 2019/0033877 | A1* | 1/2019 | Wei | E02F 9/205 |
| 2019/0250601 | A1* | 8/2019 | Donahoe | G05D 1/0033 |
| 2021/0024063 | A1* | 1/2021 | Luo | G06V 20/58 |

* cited by examiner

*Primary Examiner* — Anne Marie Antonucci
*Assistant Examiner* — Patrick Daniel Mohl
(74) *Attorney, Agent, or Firm* — Barnes & Thornburg LLP

(57) ABSTRACT

An apparatus and method for monitoring the status and health of a fleet of autonomous vehicles operating in a common space. A centralized monitoring operator receives status information and has the capability to independently interact with each autonomous vehicle in the fleet.

20 Claims, 13 Drawing Sheets

APPARATUS AND METHODS FOR MONITORING AUTONOMOUS VEHICLES

CROSS-REFERENCE TO RELATED APPLICATIONS

This application claims priority under 35 U.S.C. § 119(e) to U.S. Provisional Patent Application Ser. No. 62/907,933, filed Sep. 30, 2019, which is expressly incorporated by reference herein.

TECHNICAL FIELD

The present disclosure is related to the operation and monitoring of a fleet of autonomous vehicles. The disclosure relates to centralized monitoring of an active fleet of autonomous vehicle and methods for remotely diagnosing and resolving errors in operations of specific autonomous vehicles through augmented reality.

BACKGROUND

The use of robotic or autonomous vehicles in manufacturing and material handling applications is expanding rapidly as technology advances. The ability to adapt software to autonomous vehicles to improve decision making and perform more and more complex tasks is a driver of productivity. For example, having autonomous vehicles in a fleet cooperate and avoid dangerous interactions allows more autonomous vehicles to be used in a single workspace.

The ability for fleet members to interact and complete more complex tasks also presents additional opportunities for autonomous vehicles to encounter error conditions that they are neither programmed to recognize or resolve. Unexpected conditions, such as an unexpected impediment in a workspace or a malfunction of a particular subsystem of the autonomous vehicle can present problems that magnify within a fleet environment, such as for example, if a malfunctioning autonomous vehicle blocks the workflow of other autonomous vehicles in the fleet.

Failures of autonomous vehicle subsystems or error conditions can cripple a fleet operation in short order if not resolved. In many cases, resolution requires a human interaction that requires the human to enter the workspace and resolve the issue. The introduction of the human into the autonomous vehicle workspace presents new obstacles for the fleet members as well as potentially exposing the human to injury by one of the autonomous vehicles. This is confounded by the issue that many autonomous vehicles do not have readily available user controls to operate the autonomous vehicle and, even if present, the autonomous vehicle is not likely to be adapted for an operator to manually operate the autonomous vehicle.

Still further, the need to have humans on "stand-by" reduces the productivity gains provided by a fleet of autonomous vehicles. When operating properly, autonomous vehicle fleets need little to no intervention in the normal activities. For example, autonomous vehicles may be programmed to return to charging/fueling stations when needed and may take themselves out of service when preventative maintenance is required. Thus, there is no need for humans to be present when the fleet, or any particular autonomous vehicle, is operating correctly. There is a need to have humans available in the vicinity of the autonomous vehicles if error conditions arise.

Improved performance of autonomous vehicles and the reduction of the need for nearby humans to resolve errors and system malfunctions in autonomous vehicles would provide additional productivity and cost reductions, as well as reducing the potential for injury to humans. Still further, due to the limited number of issues that occur in a particular workspace, reducing or eliminating the need for human physical interaction presents the potential for additional productivity gains.

SUMMARY

The present disclosure includes one or more of the features recited in the appended claims and/or the following features which, alone or in any combination, may comprise patentable subject matter.

According to an aspect of the present disclosure, an autonomous vehicle tracking system comprises at least one autonomous vehicle and a centralized monitoring station. The at least one autonomous vehicle includes a control system. The control system includes a drive system, a plurality of sensors, a camera, and a controller. The drive system provides power for the autonomous vehicle and is operable to move the autonomous vehicle and to operate accessories of the autonomous vehicle. The sensors provide signals indicative of real-time information regarding the location and operation of the autonomous vehicle. The camera system provides signals representative of images of the environment surrounding the autonomous vehicle. The controller includes a processor and a memory device. The memory device includes instructions that, when executed by the processor, cause the processor to receive signals from the sensors and the camera system, aggregate the signals to create an array of data that is a composite of the sensor signals and the camera signals that represents a time-sequenced composite image file that superimposes data derived from the sensor signals onto the images from the camera system. The centralized monitoring station includes a computer, a user input device, and a display device. The computer is in communication with the controller of the at least one autonomous vehicle. The computer includes a processor and a memory device. The user input device is in communication with the computer. The display device is in communication with the computer. The memory device of the computer includes instructions that, when executed by the processor, cause the processor to process inputs from the user input device to communicate with the controller of the autonomous vehicle to prompt the controller transmit portions of the time-sequenced composite image file under the control of the user input device, the transmitted image file being received by the computer and displayed by the display device.

In some embodiments, the time-sequenced composite image file is transmitted in real time and the portion transmitted varies based on the user input to generate a field of view perceptible to a human.

In some embodiments, the display device comprises a head set and the user input device is coupled to the headset such that movement of the head set changes the portion of the image file transmitted responsive to movement of the headset to change the field of view being displayed by the head set.

In some embodiments, the user input device includes an input for varying the point in time which corresponds to the portion of the image file being transmitted, such that a user may choose to view the portion of the image file as it existed a different time from current real-time.

In some embodiments, the portion of the image file transmitted is responsive to the position of the head set, such that the user may vary the field of view at the different time to view the surroundings of the autonomous vehicle at that point in time.

In some embodiments, the time sequence may be paused such that a user may look around the autonomous vehicle at a single point in time by moving the head set to change the field of view.

In some embodiments, the system includes a plurality of autonomous vehicles and the computer is in communication with the controller of each of the autonomous vehicles such that a user may select any of the plurality of autonomous vehicles and view the surroundings of the particular autonomous vehicle using the user input device and the head set.

In some embodiments, the centralized monitoring station is operable to provide mission tasks to each of the plurality of autonomous vehicles, the centralized monitoring system including a monitor that provides current status of each of the plurality of autonomous vehicles.

In some embodiments, the system includes a plurality of cameras positioned in the working environment of the plurality of autonomous vehicles, the cameras providing a signal representative of images of portions of the working environment of the plurality of vehicles, the cameras including memory to store an array of data that represents a time-sequenced image file for the field of view of the particular camera.

In some embodiments, the computer is operable to transmit a signal to each of the autonomous vehicles and cameras to simultaneously change the point of time that the time-sequenced images are presented such that an operator may toggle between the views of each of the autonomous vehicles and each of the cameras at a coordinated point in time, the portion of the image file being transmitted by each autonomous vehicle being responsive to the position of the head set of the user.

In some embodiments, the position of the head set is calibrated from a particular datum in the environment of the plurality of autonomous vehicles.

In some embodiments, the position of the head set is calibrated from a neutral position relative to the particular camera or autonomous vehicle.

In some embodiments, each of the plurality of autonomous vehicles is operable to transmit an alert condition to the centralized monitoring station, the alert condition prompting the alert to be logged to the particular real time of the alert, and wherein the computer is operable to mark the point in time such that a user may choose the time of the alert to view the images from the cameras or autonomous vehicles.

According to another aspect of the present disclosure, an autonomous vehicle comprises a control system including a drive system, a plurality of sensors, a camera system, and a controller. The control system includes a drive system, a plurality of sensors, a camera, and a controller. The drive system provides power for the autonomous vehicle and is operable to move the autonomous vehicle and to operate accessories of the autonomous vehicle. The sensors provide signals indicative of real-time information regarding the location and operation of the autonomous vehicle. The camera system provides signals representative of images of the environment surrounding the autonomous vehicle. The controller includes a processor and a memory device. The memory device includes instructions that, when executed by the processor, cause the processor to receive signals from the sensors and the camera system, aggregate the signals to create an array of data that is a composite of the sensor signals and the camera signals that represents a time-sequenced composite image file that superimposes data derived from the sensor signals onto the images from the camera system.

In some embodiments, the time-sequenced composite image file is transmitted in real time and the portion transmitted varies based on a user input to generate a field of view perceptible to a human, the field of view changing based on the user input.

In some embodiments, the user input varies the point in time which corresponds to the portion of the image file being transmitted, such that a user may choose to view the portion of the image file as it existed a different time from current real-time.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
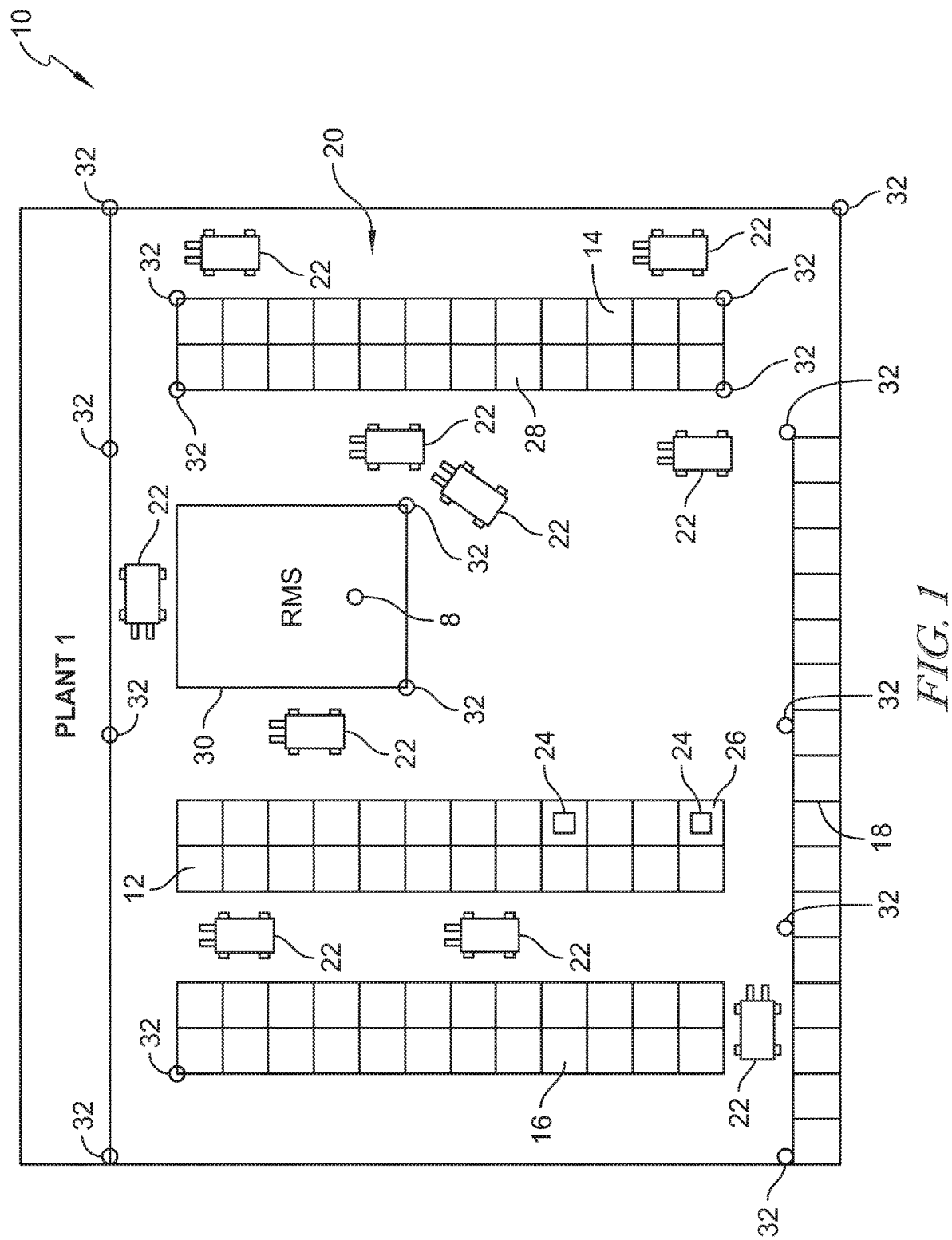
FIG. 1 is diagrammatic floor plan of a material storage facility including a autonomous vehicles used to move materials between storage locations, a number of cameras positioned throughout the facility, and a remote monitoring station.

According to the present disclosure, a material storage facility 10 includes a number of storage racks 12, 14, 16, 18 positioned in a workspace 20 of the material storage facility 10. The material storage facility 10 also includes a number of autonomous vehicles 22 that operate within the material storage facility 10 to process materials in the material storage facility 10, including, in some embodiments, moving materials 24 from one storage location 26 to another storage location 28. It should be understood that the autonomous vehicles 22 may also move materials from the particular material storage facility 10 to another location outside of the material storage facility 10, such as to a manufacturing or distribution location outside of the material storage facility 10. In the embodiment of FIG. 1, the material storage facility 10 is illustrative only and the equipment and methods disclosed herein may be applied to the use of autonomous vehicles 22 in various facilities and applications.

The material storage facility 10 further includes a remote monitoring station (RMS) 30 positioned in the material storage facility 10. An operator 8 is located in the remote monitoring station 30 and responsible for monitoring the fleet of autonomous vehicles 22 and resolving issues or error conditions. The positioning of the remote monitoring station 30 in the material storage facility 10 is for illustrative purposes only. The remote monitoring station 30 may be positioned outside of the material storage facility 10 at the same location, or may be positioned in a geographically distant location, such as a single remote monitoring station 30 facility that provides monitoring for various material storage facilities 10 around the world. The material storage facility 10 also includes a number of fixed cameras 32 positioned throughout the workspace 20 and positioned to provide viewing coverage of the workspace 20 in which the autonomous vehicles 22 operate.

Figure 2:
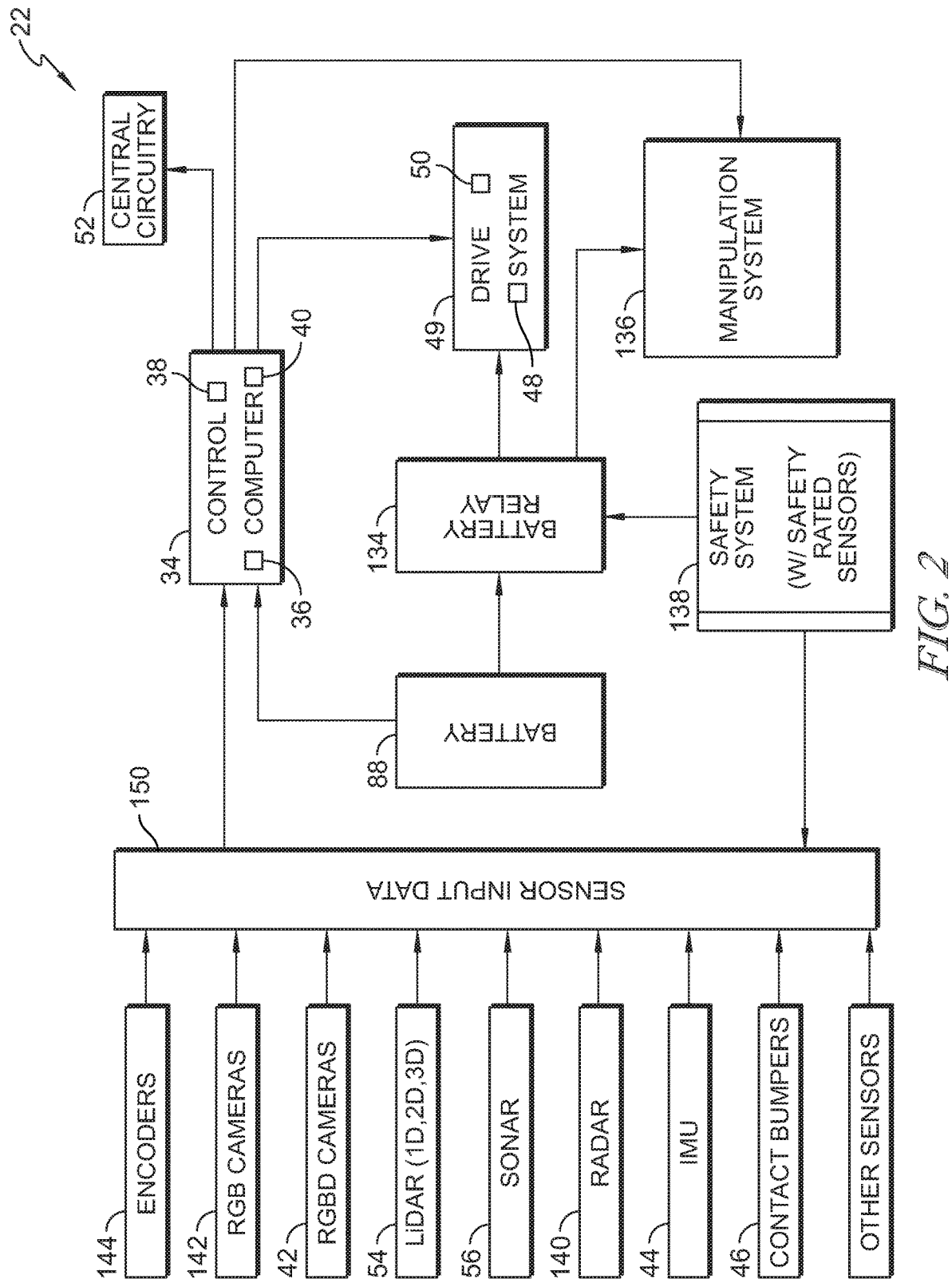
FIG. 2 is a block diagram of the components of an illustrative autonomous vehicle of FIG. 1.

Referring now to FIG. 2, the autonomous vehicle 22 includes a controller 34 that is responsible for operation of the particular autonomous vehicle 22. The controller 34 includes a processor 36 and memory 38. The processor 36 is in communication with the memory 38 and the memory 38 includes instructions that, when executed by the processor 36, cause the controller 34 to control the functionality of the autonomous vehicle 22. The processor 36 may be embodied as any type of processor capable of performing the functions described herein. For example, the processor 36 may be embodied as a single or multi-core processor(s), a single or multi-socket processor, a digital signal processor, a graphics processor, a microcontroller, or other processor or processing/controlling circuit. Similarly, the memory 38 may be embodied as any type of volatile or non-volatile memory or data storage capable of performing the functions described herein. In operation, the memory 38 may store various data and software used during operation of the controller 34 such as operating systems, applications, programs, libraries, and drivers. The memory 38 is communicatively coupled to the processor 36 via the I/O subsystem 40, which may be embodied as circuitry and/or components to facilitate input/output operations with the processor 36, the memory 38, and other components of the controller 34 or other components of the autonomous vehicle 22. For example, the I/O subsystem 40 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 40 may form a portion of a system-on-a-chip (SoC) and be incorporated, along with the processor 36, the memory 38, and other components of the controller 34 on a single integrated circuit chip.

Autonomous vehicle 22 includes a number of sensors 150 providing data to the controller 34. The sensors 150 include an array of cameras 42 positioned in various locations on the autonomous vehicle 22 to provide a three-hundred-sixty degree view of overlapping fields of view to provide an remote operator 8 full access to view the surroundings of the autonomous vehicle 22. The cameras 42 are embodied as RGBD cameras, providing enhanced information controller 34 that will be used as discussed below. In some embodiments, the autonomous vehicle may also include an array of RGB cameras 142 that provide visual data without the enhanced depth of the RGBD cameras 42. The autonomous vehicle 22 also includes one or more on-board inertial measurement units (IMUs) 44 to provide input to the controller 34 regarding changes in acceleration and orientation of the autonomous vehicle 22 in three-space during use. Still further, the autonomous vehicle 22 also includes an array of contact sensors 46 positioned on the autonomous vehicle 22 so that any physical contact between the autonomous vehicle 22 and some other item in the environment can be detected. Using the array of cameras 42, accelerometer(s) 44, and contact sensor array 46, the controller 34 is operable to sense the environment around the autonomous vehicle 22 to control the autonomous vehicle 22 as it completes its mission. In addition, the array of cameras 42, accelerometer(s) 44, and contact sensor array 46 allows the controller 34 to identify unexpected conditions that may require a response by the autonomous vehicle 22 or an intervention by an operator 8 positioned at the remote monitoring station 30. In some embodiments, the autonomous vehicle 22 may also include an array of LiDAR sensors 54 positioned about the autonomous vehicle 22 and operable to provide additional information to the controller 34 regarding the environment about the autonomous vehicle 22. Still further, in some embodiments, the autonomous vehicle 22 may also include an array of sonar sensors 56 positioned about the autonomous vehicle 22 and operable to provide additional information to the controller 34 regarding the environment about the autonomous vehicle 22. Additional sensors or sensor systems 150 of the autonomous vehicle 22 may include encoders 144 for measuring movement of components of the autonomous vehicle 22 or radar sensors 140. Other sensors 152 may be used as required by a particular application.

Also shown in the block diagram of FIG. 2, the autonomous vehicle 22 includes a drive system 49 which is operated, under the control of the controller 34 to move and steer the autonomous vehicle 22. The drive system 49 includes a drive 50 controlled by a drive controller 48 that communicates with controller 34 and provides the control signals for the drive 50. It should be understood that the autonomous vehicle 22 could have other functionality, in addition to the drive 50, including a manipulation system 136 which may embodied as various implements such a fork-lift mast system, articulators to move materials onto and off from the autonomous vehicle 22, or any of a number of other functions and sub-systems that adapt the autonomous vehicle 22 for specific purposes. The variation in functionality is limited only by the technical capabilities of a particular physical arrangement and the principles disclosed herein may be used with any fleet of autonomous vehicles 22 that interact within a pre-defined workspace, such as workspace 20, for example.

The autonomous vehicle 22 also includes communication circuitry 52 that allows the autonomous vehicle 22 to interact with the remote monitoring station 30 and to share data there between. The communications circuitry 52 can take many forms and be similar to the input/output controller 40 or be modified for a particular application. It is contemplated that the communications circuitry 52 would include a high-speed wireless communications protocol to allow data to be shared between the controller 34 and the remote monitoring station 30 in real-time to allow the autonomous vehicle 22 to operate at relatively high speeds in the workspace 20.

As will be explained in further detail below, the array of cameras 42, accelerometer(s) 44, and contact sensor array 46, and optionally the LiDAR array 54 and/or sonar array 56 provide signals to the controller 34 that are then processed and stored in memory 38 to provide a time sequenced data based on the inputs from the various sensors 42, 44, 46, 54, and 56 that can be combined to provide a historical composite of the data that can create a composite image and status that allows a user to reconstruct the environment of the autonomous vehicle 22 at an earlier point in time. This is useful for an operator 8 to diagnose a particular problem experiences by an autonomous vehicle 22 by viewing the surroundings of the autonomous vehicle 22 at an earlier point in time. The data can also be combined to create a composite image available to the operator 8 at the remote monitoring station 30 in real-time so that the operator 8 may manually operate the autonomous vehicle 22 using the combined data.

The autonomous vehicle 22 also includes an independent safety system 138 with safety rated sensors that are operable to limit operation of the autonomous vehicle 22. The autonomous vehicle 22 includes a battery 88 which powers the various components of the autonomous vehicle 22. The battery 88 interfaces with a battery relay 134 which is operable to interrupt power to both the manipulation system 136 and drive system 49 to prevent operation of those systems in critical safety situations. If the safety system 138 detects an unsafe condition, the power to the manipulation system 136 and drive system 49 is cut until the unsafe condition is resolved.

Figure 4:
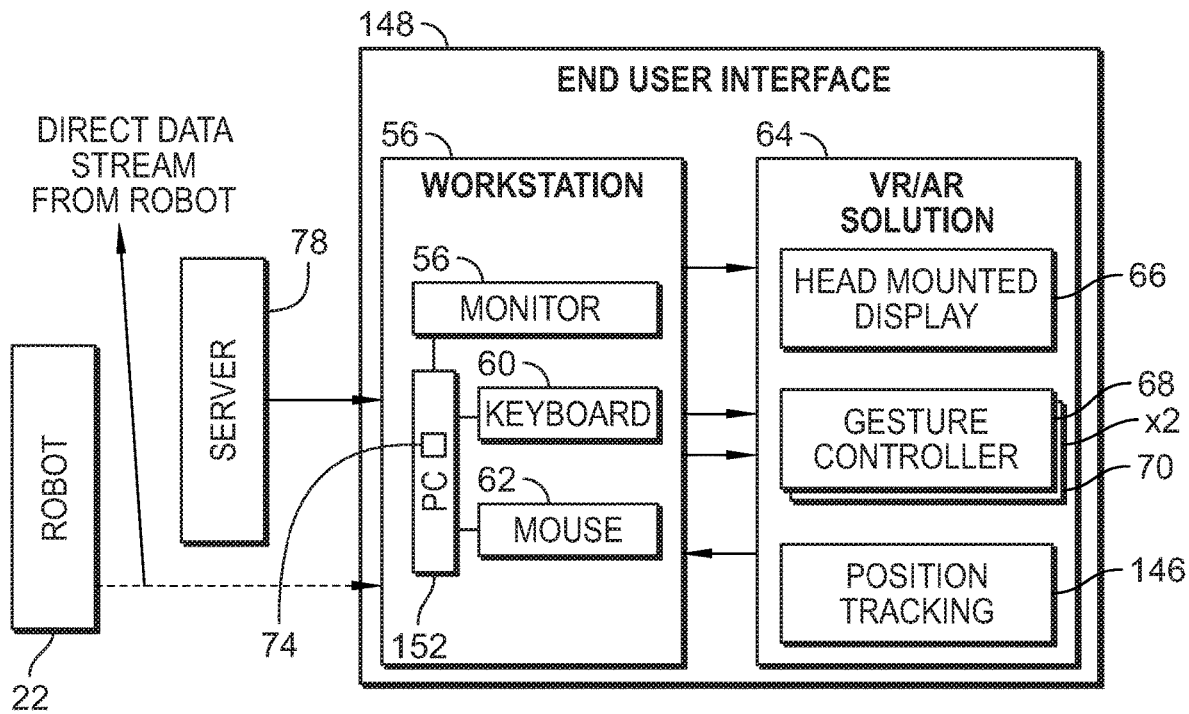
FIG. 4 is a block diagram of the remote monitoring station of FIG. 1.

The remote monitoring station 30 is shown diagrammatically in FIG. 4 and includes a workstation 56 that includes a computer 152, a display 58, a QWERTY keyboard 60, and a mouse 62. The display 58 may include multiple discrete display devices or may be segmented to provide views of status screens of multiple material storage facilities 10 simultaneously. For example, referring to FIG. 8, a status screen of a single material storage facility 10 is shown. The display 58 may be configured to simultaneously show each material storage facility 10 the operator 8 is monitoring updated with real-time location and status indicators of the various autonomous vehicles 22. For example, each autonomous vehicle 22 that is not in an error condition could be shown in one color, such as green, for example. Any autonomous vehicles 22 that is experiencing an error condition, such as the specific autonomous vehicle 22' shown in FIG. 8, may be shown in a different color, such as yellow or red, for example, depending on the urgency of the error condition. In some embodiments, the display 58 is configured as a touchscreen display, permitting an operator 8 to interact directly with the display to provide inputs to the workstation 58. The workstation 58 may be a special purpose computer device, or may be a general purpose computer device with operating systems, firmware, and software specially configured to perform the functions described herein.

Figure 5:
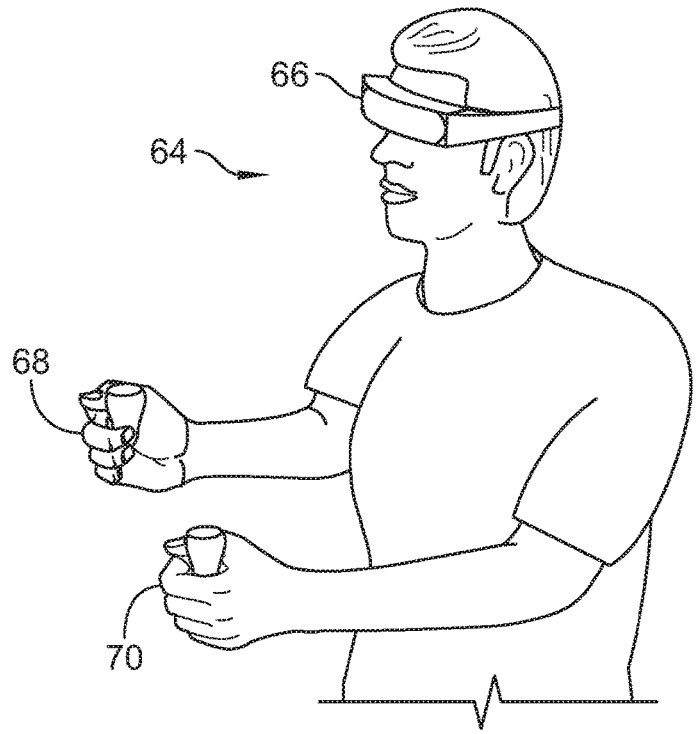
FIG. 5 is diagrammatic representation of an augmented reality interface for a user positioned in the remote monitoring station.

The remote monitoring station 30 also includes an augmented reality interface 64 that is worn by an operator 8 when the operator 8 is monitoring the one or more material storage facilities 10 as shown in FIG. 5. The augmented reality interface 64 includes a head set 66, and, optionally, may include a pair of gesture sensors 68, 70 worn by the operator 8 or position tracking sensor 146 that monitors movements and gestures of the operator 8. The head set 66 provides a heads up display of information presented to a display 72 of the head set 66. In operation, the augmented reality interface 64 is not active during normal operations of a group of autonomous vehicles 22 being monitored by an operator 8. The operator 8 is able to see through the display 72 and perform normal procedures in the remote monitoring station 30. However, if a particular autonomous vehicle 22 experiences an error condition, the operator 8 may select the particular autonomous vehicle 22 on the display 58 of the workstation 56 to activate the augmented reality interface 64 as a virtual controller for the particular autonomous vehicle 22. When the autonomous vehicle 22 is selected, the augmented reality interface 64 activates the display 72 and places in the operator 8 in a virtual operator compartment for the particular autonomous vehicle 22, presenting a real-time augmented display using information from the array of cameras 42, accelerometer(s) 44, and contact sensor array 46, and optionally the LiDAR array 54 and/or sonar array 56 so that the operator 8 may operate the autonomous vehicle 22 virtually, from the remote monitoring station 30. As will be explained below, the view presented to the operator 8 will be dependent on the position and orientation of the operator's head so that as the operator 8 moves her head in real space, the augmented view presented to the operator 8 on the display 72 changes with the signals from the array of cameras 42, accelerometer(s) 44, and contact sensor array 46, and optionally the LiDAR array 54 and/or sonar array 56 being presented in a composite image that allows the operator 8 to comprehend the current state of the environment, including the relative distance of certain elements of the environment surrounding the autonomous vehicle 22. The gesture sensors 68, 70 allow the operator 8 to activate virtual controls for the autonomous vehicle 22, such as a virtual joystick driver controller, for example.

Figure 3:
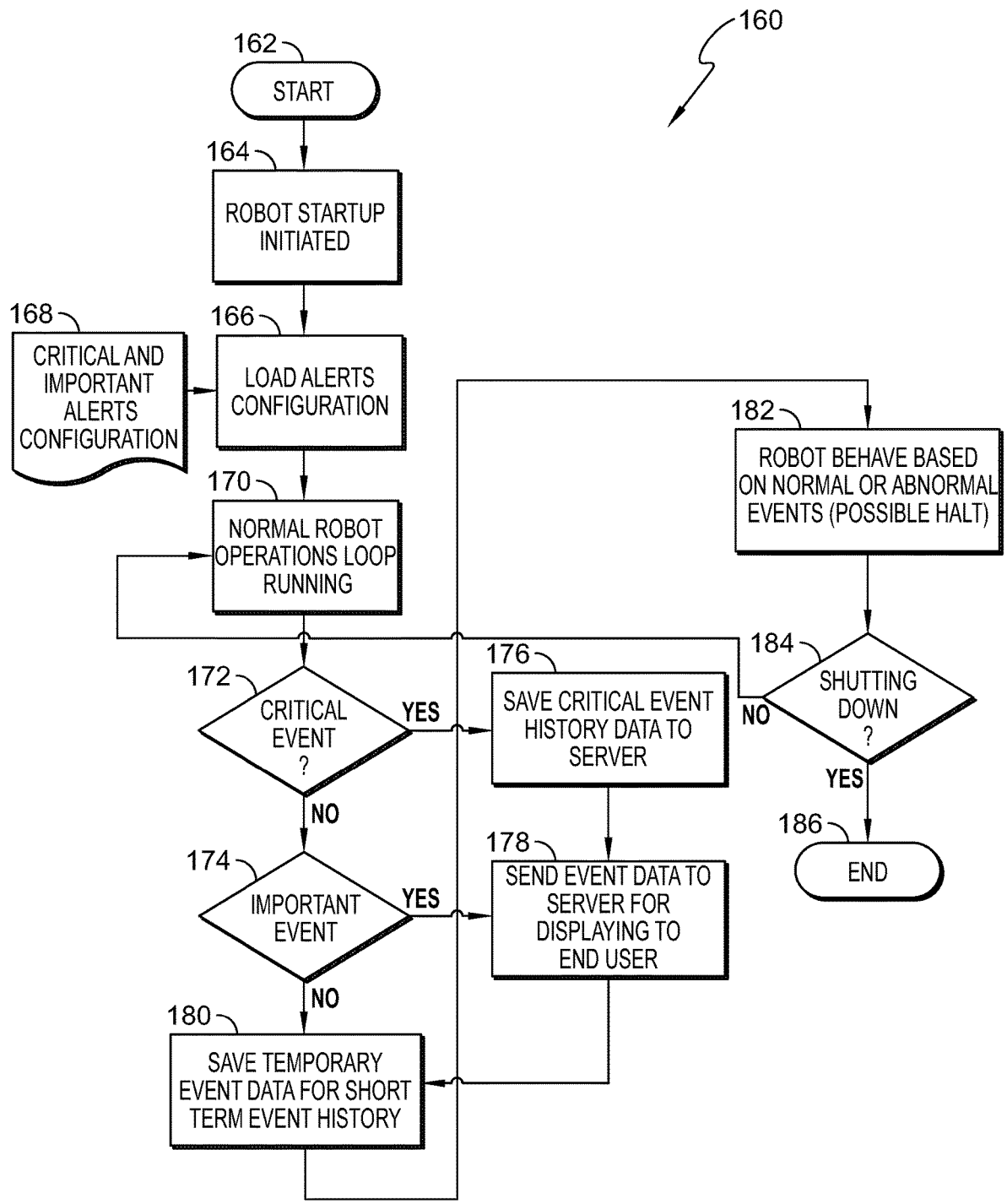
FIG. 3 is a flow chart showing an algorithm used by the autonomous vehicle of FIG. 1 to manage sensor data from various sensors of the autonomous vehicle.

Referring now to FIG. 3, a process 160 for managing data collected by the sensors 150 of the autonomous vehicle 22 includes a start-up at step 162. Once the autonomous vehicle 22 is started at step 162, a start-up process step 164 initializes all of the functions and systems of the autonomous vehicle 22 are initialized. The process 160 then advances to a process step 166 where a pre-defined alerts configuration is applied to the controller 34. The alerts configuration is defined separately at a process 168 and transmitted to the controller 34 by the server 78 of the remote monitoring station 30. The pre-defined alerts configuration is established based on the operating environment of the particular autonomous vehicle 22.

Once the alerts configuration is loaded at step 166, the process 160 advances to a normal operating process 170. The process continuously progresses through a decision tree where the data from the sensors 150 is evaluated to determine if a critical event has occurred at decision step 172. If no critical event is detected, the process 160 progresses to a decision step 174 to determine if any important events have occurred. If a critical event is detected at decision step 172, then the process 160 advances to a step 176 wherein critical event data is saved to the server 78. Then the process 160 progresses to step 178 where the event data is displayed to the operator 8 at the remote monitoring station 30.

If no critical event is detected at step 172 and no important event is detected at step 174, then the process advances to step 180 where sensor data is temporarily saved as short-term data. This short-term data is not maintained beyond a predetermined period as the data set becomes overwhelming for the controller 34. However, the short-term event data is available to the operator 8 in certain situations as discussed below. If important data is detected at step 174, then the process 160 advances to step 178 discussed above and then advances to the step 180.

From step 180, the process advances to step 182 where the autonomous vehicle 182 operates based on the detected data. The operation is evaluated at decision step 184 to determine if operation of the autonomous vehicle 22 should continue. If the data indicates that the autonomous vehicle 22 is safe to operate, then the process 160 returns to step 170 and progresses through the decision tree described above. If the autonomous vehicle 22 is not safe to operate, then the decision step 184 initiates a shut-down and the process progresses to and end step 186 where the autonomous vehicle 22 is inoperable until the shut-down condition is resolved by the operator 8.

Figure 14:
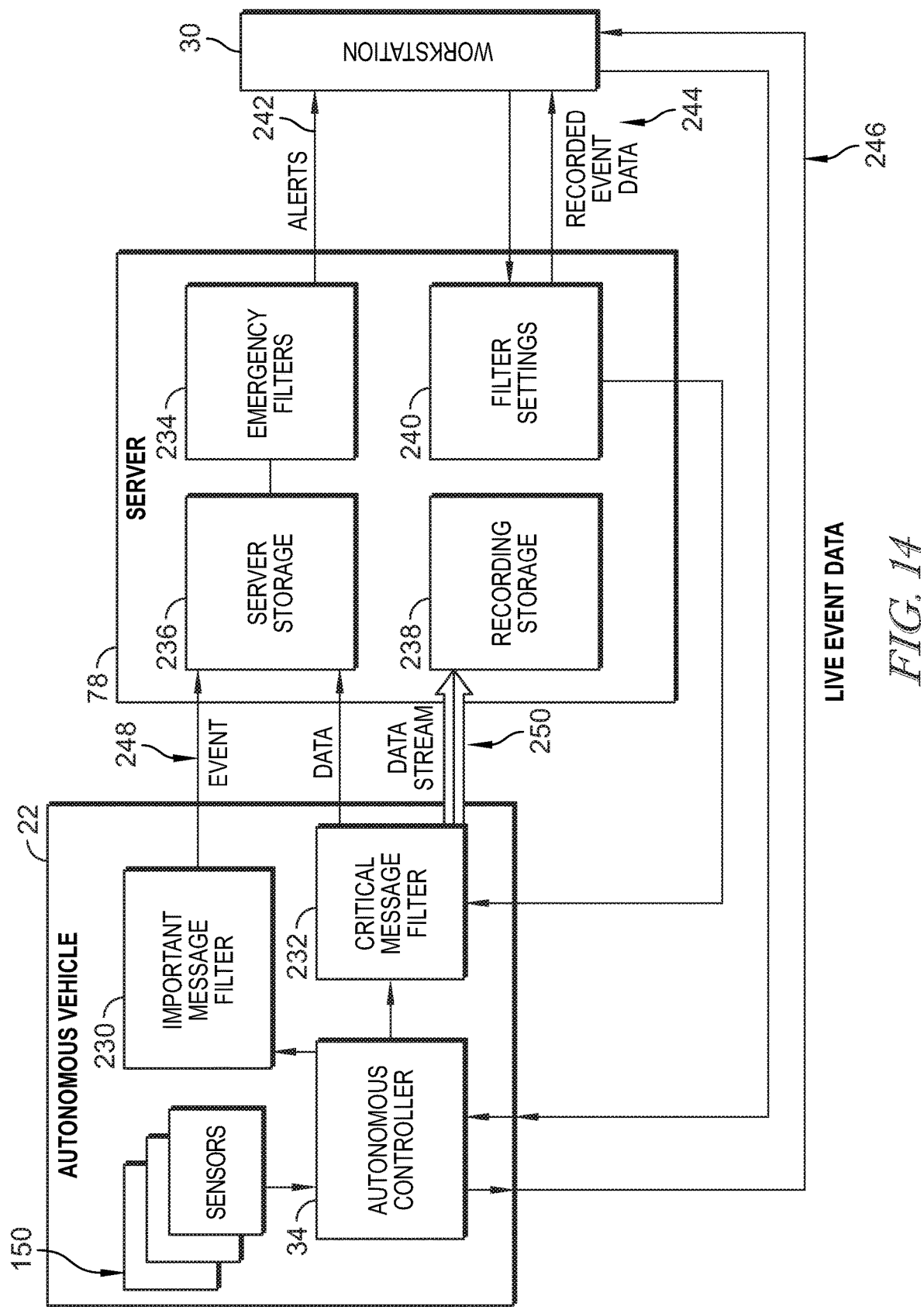
FIG. 14 is a diagram of the communications between a particular autonomous vehicle and the remote monitoring station.

Referring to FIG. 14, a diagrammatic representation of the data flow between the autonomous vehicle 22, the server 78, and the workstation 56 is shown. The data from the sensors 150 is provided to the controller 34 of the autonomous vehicle 22 which shares that data as live event data 246 with the remote monitoring station 30. The data from the sensors 150 is also applied to an important message filter 230 imbedded in the software of the controller 34 and, when an important event is detected, the important event data 248 is transferred to server storage 236. If a critical event is detected by the critical event filter 232 of the controller 34, then the event data 248 is transferred to the server storage 236. In addition, upon detection of a critical event by the critical event filter 232, data stream 250 moves the data from the sensors 150 to a recording storage location 238 in the memory of the server 78. The event data 248 is applied to emergency filters 234 on the server 78 to determine if an emergency condition is detected. If so, alerts 242 are forwarded to the remote monitoring station 30. The data stream 250 placed in recording storage 238 is available to the remote monitoring station 30 through a transfer 244 of recorded event data. In addition, the remote monitoring station 30 is operable to update filter settings 240 which may be applied to the filters 230, 232 of the autonomous vehicle 22 by the server 78 at process step 166 discussed above.

Thus, when an event occurs requiring the operator 8 to assess the environment of the autonomous vehicle 22, the operator 8 may also be able to move back in time, virtually, to view the environment of the autonomous vehicle 22 at the earlier time based on the data saved to the autonomous vehicle at step 180 or the server at step 176. The operator 8 may move their head to view different fields of view around the autonomous vehicle 22 at that point in time, with the information on the display being presented as an augmented reality image. This is useful for the operator 8 to reconstruct the environment of the autonomous vehicle 22 prior to the error condition. The data from the array of cameras 42, accelerometer(s) 44, and contact sensor array 46, and optionally the LiDAR array 54 and/or sonar array 56 is stored in memory 38 and is used to reconstruct the image on the augmented reality interface 64 as if it were in real-time. As such, the operator 8 is able to detect any abnormalities, improving the ability to resolve the alert condition.

The workstation 56, through communications circuitry 76, is also in communication with the cameras 32 positioned throughout the workspace 20 and selectively accessible by the operator 8 to choose a particular camera 32 to view the workspace 20 from the perspective of the particular camera 32. A server 78 facilitates the communication between the workstation 56, cameras 32, and autonomous vehicles 22 so that all of the information is available to operator 8. This functionality is available in real-time such that when an error condition is triggered, such as with the autonomous vehicle 22' in FIG. 8, for example, the operator 8 may choose a particular camera 32, such as camera 32' in FIG. 8, that has the autonomous vehicle 22' in its field of view to review the environment of the autonomous vehicle 22' from the perspective of the camera 32. This may occur prior to the operator 8 engaging the augmented reality interface 64 for the autonomous vehicle 22'. In this way, the operator 8 will have some context as to the environment of the autonomous vehicle 22' before becoming the virtual operator 8 of the autonomous vehicle 22'.

The data from the cameras 32 are maintained in memory 74 on the workstation 56 or at the server 78. When the operator 8 has time-shifted the information presented on the augmented reality interface 64 as discussed above, the workstation 56 receives the time-shift information and resets the images from the various cameras 32 to the same point in time as the—time-shifted such that the operator 8 may toggle between the virtual operator condition and viewing the workstation 56 at the time-shift to thereby review the view from any of the cameras 32 to further diagnose the error condition. This further assists the operator 8 in diagnosing the error condition of the autonomous vehicle 22'.

Figure 12:
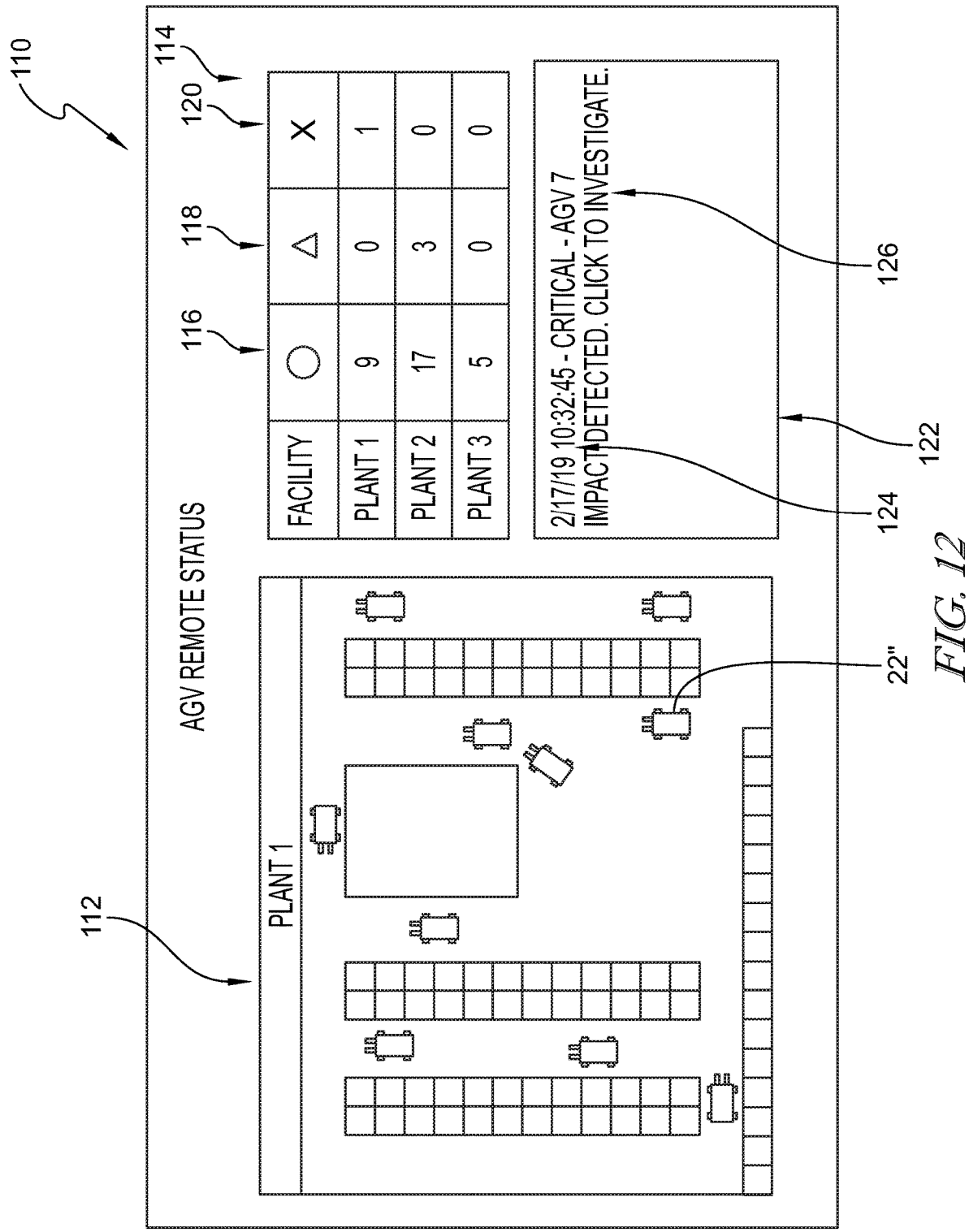
FIG. 12 is an example of a monitor screen of the remote monitoring station in an alert condition that has been identified due to the detection of an impact.

Importantly, the workstation 56, through the server 78, is also operable to reset available information in all of the adjacent autonomous vehicles 22 to the time-shifted point in time. Thus, while the operator 8 is engaged with a virtual time-shift, any of the actions the operator 8 takes will be in reference to the particular point in time that the operator 8 has shifted to, until the time-shift is released. For example, the operator 8 can move from being the virtual operator 8 of the autonomous vehicle 22' if FIG. 8 to the virtual operator 8 of the autonomous vehicle 22" in FIG. 8 and will have the perspective of autonomous vehicle 22" to view the autonomous vehicle 22' as the operator 8 diagnoses an error condition. In this way, the available views and information for the operator 8 is expanded to include other members of the fleet of the autonomous vehicles 22. The time-shift may be completed by selecting a particular point in real-time, through typical A/V playback controls on the augmented reality interface 64 or workstation 56, or by an error message 126 as shown in FIG. 12. Because the error message is time-stamped, selecting the time-stamp will may automatically move the various information stored in memory 38 and/or memory 74 to that particular point in time to allow the operator 8 to quickly make the virtual time-shift in the augmented reality interface 64.

Figure 6:
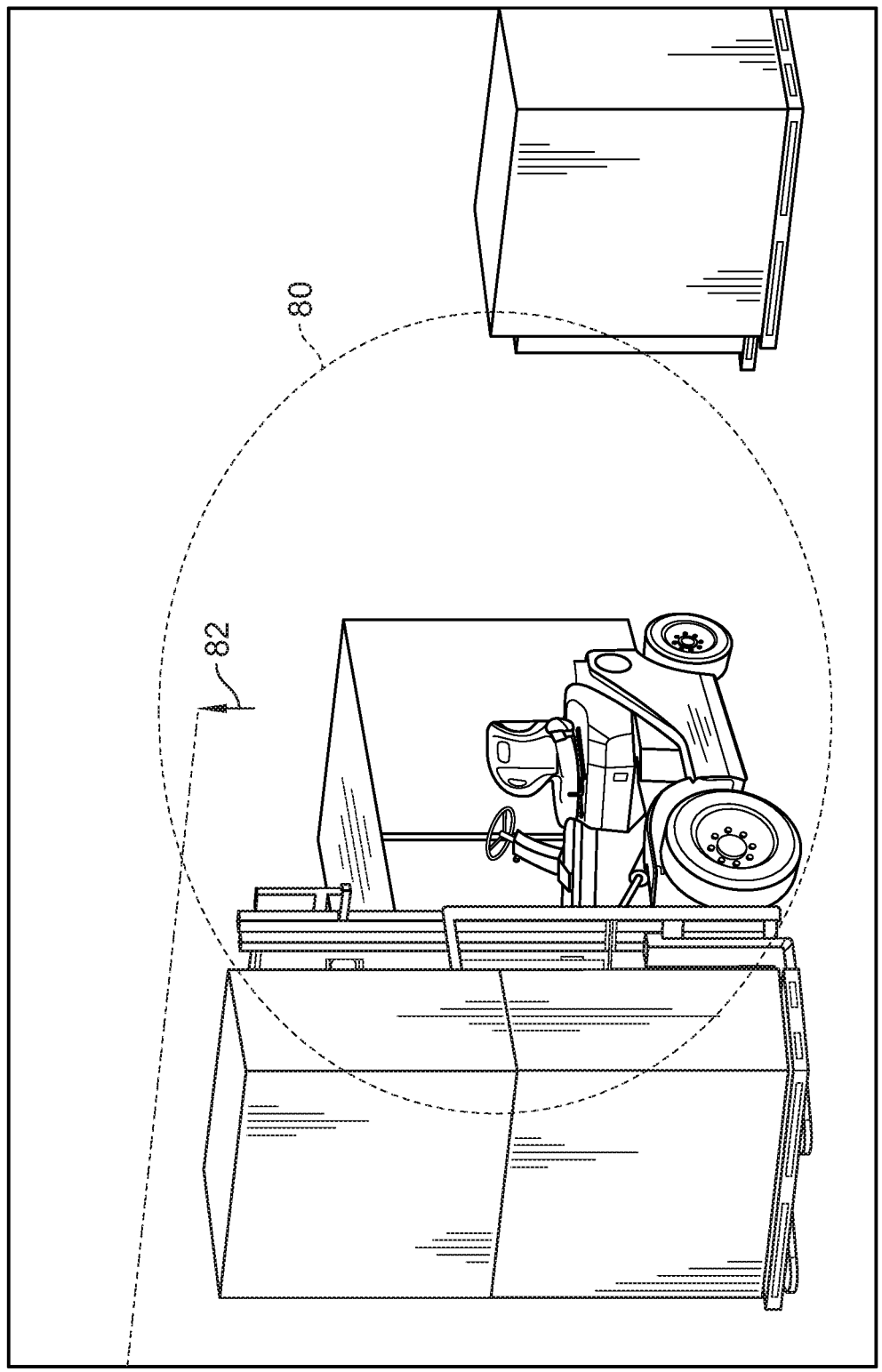
FIG. 6 is a perspective view of a portion of a working environment as viewed from the augmented reality interface, with the field of view of the augmented reality interface superimposed to show the limitations of the field of view of augmented reality interface at a particular moment in time.
Figure 9:
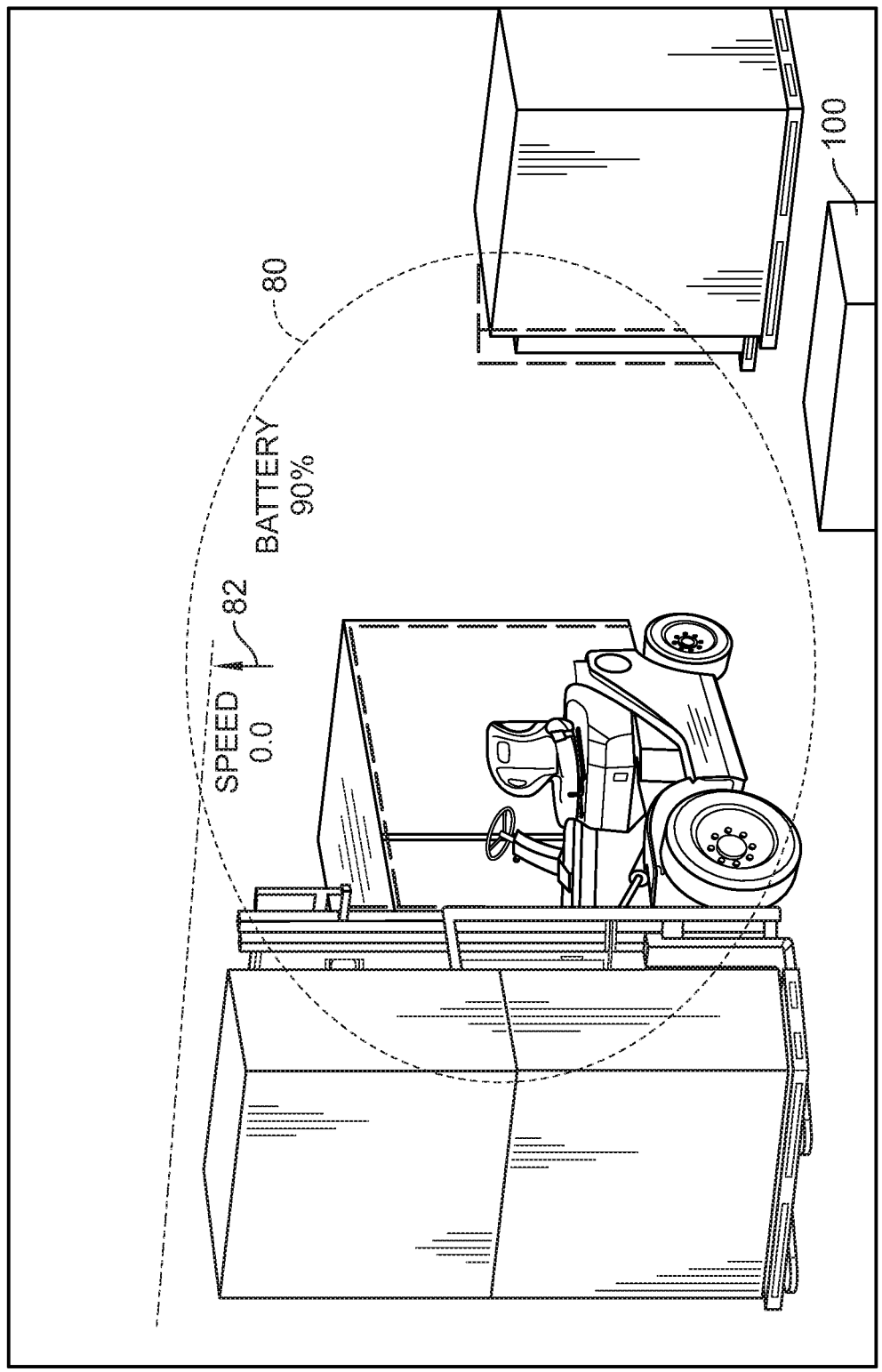
FIG. 9 is a composite image similar to FIG. 7 showing an obstruction in the path of the autonomous vehicle, the obstruction outside of the field of view of the augmented reality interface.
Figure 10:
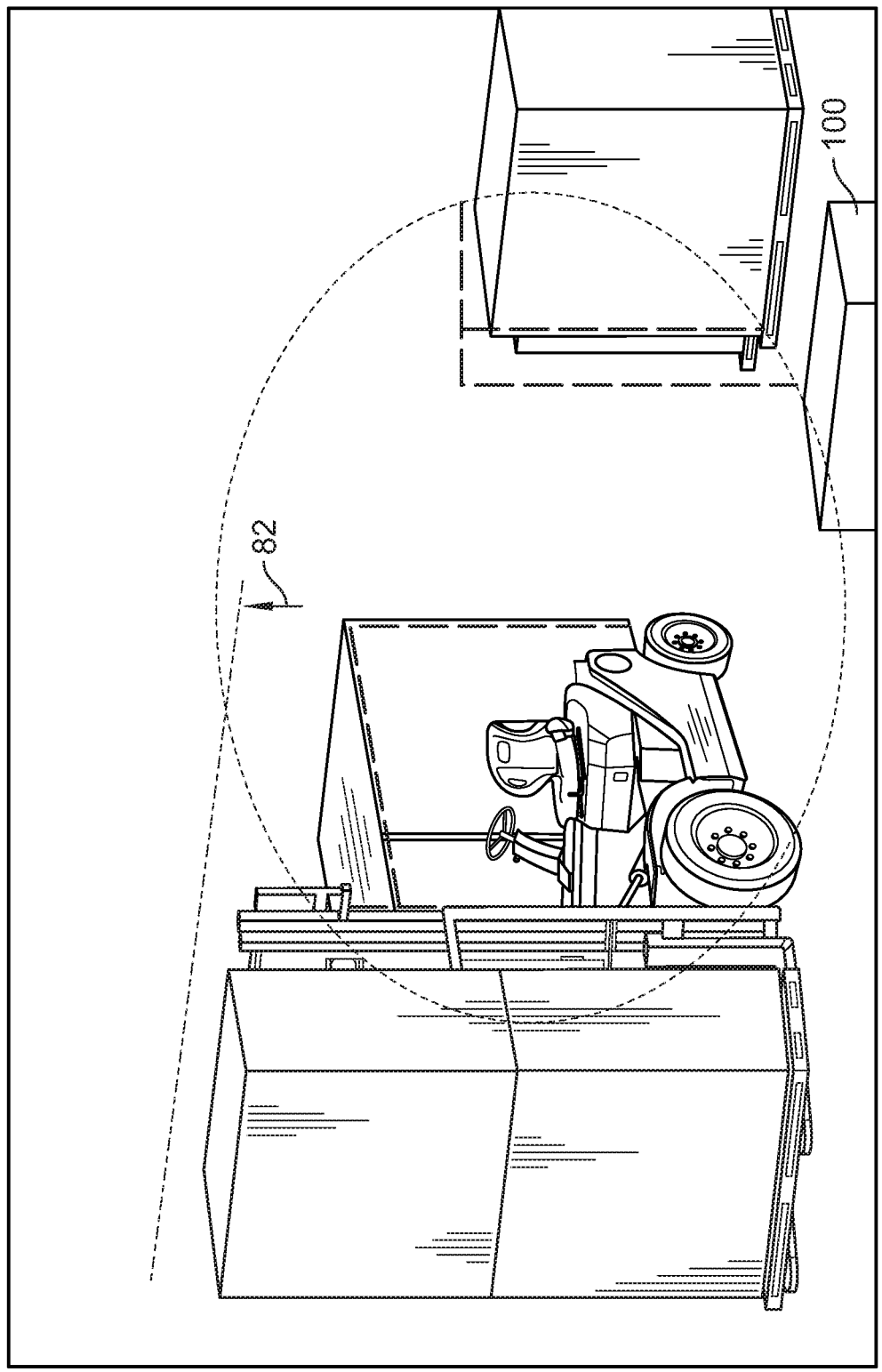
FIG. 10 is the composite image of FIG. 9 with the field of view adjusted to show the obstruction.

As shown in FIG. 6, the field of view 80 available on the display 72 is limited. It should be understood that the representations of the field of view 80 in FIGS. 6, 7, 9, and 10 that follow are presented as examples only. The shape and size of the field of view 80 may vary depending on application and the information presented in the augmented view presented on display 72 may vary depending on the needed information. In the view shown in FIG. 6, an arrow indicator 82 provides the operator 8 with a reference of the view being presented to the front of the particular autonomous vehicle 22. As shown in FIG. 10, the orientation of the arrow 82 changes as the operator 8 moves her head and changes the field of view. FIG. 6 shows a typical view of the environment around the autonomous vehicle 22. In practice, this display will normally be in high definition color. The view of FIG. 6 shows the autonomous vehicle 22" from the view of autonomous vehicle 22'. It should be understood that the view of FIG. 6 omits background that would be visible to improve the clarity of the discussion here.

Figure 7:
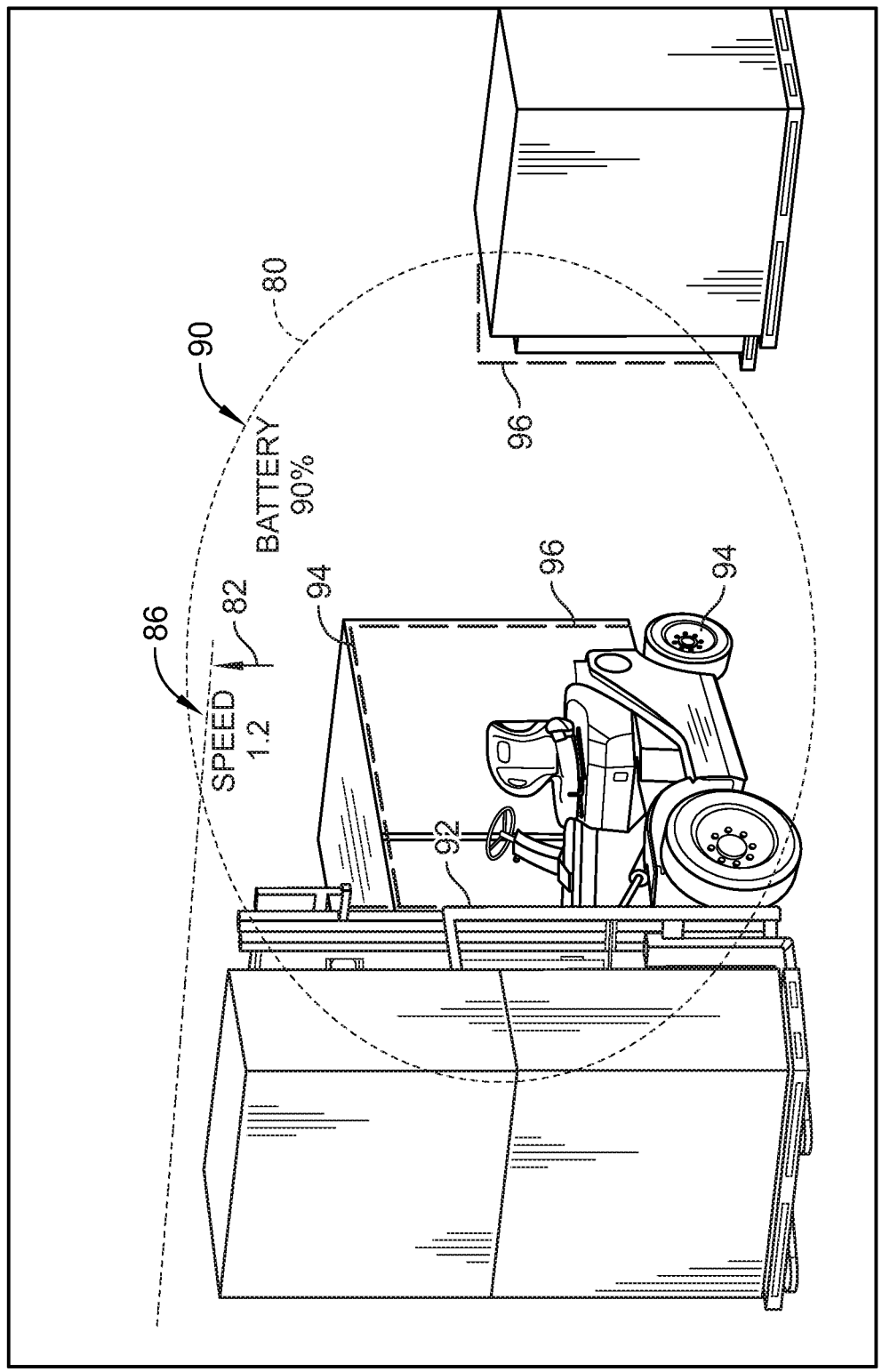
FIG. 7 is a composite image of the field of view from an autonomous vehicle as viewed by the augmented reality interface including data elements superimposed on the image to provide the user of the augmented reality interface with additional information.

FIG. 7 shows the view of FIG. 6, with the display 72 being updated to include augmentation from the array of cameras 42, accelerometer(s) 44, and contact sensor array 46, and optionally the LiDAR array 54 and/or sonar array 56. In addition, other feedback may be presented such as ground speed 86 from the drive controller 48 or the level of charge 90 of the battery 88. The augmentation presented also includes indications of the distance of various objects and points as indicated by the dashed lines presented in FIG. 7. For example, the heavier dashed lines 92 in FIG. 7 indicate that the autonomous vehicle 22" is relatively close to the autonomous vehicle 22'. The thinner lines 94 indicate that those features are farther away. Similarly, the dashed lines 96 indicate that the pallet 98 is relatively far away. In the present disclosure, the thickness of the lines 92, 94, and 96 varies to provide information regarding the relative distance. It should be understood that in implementation, the lines may be presented differently, including different colors and may also blink or flash at varying rates to provide appropriate feedback to the operator 8.

Referring to FIG. 12, an example of a status screen 110 shown on the display 58 of the workstation 56 would be communicated to the operator 8 with the autonomous vehicle 22' being shown in a critical condition. The display includes a diagrammatic representation 112 of the material storage facility 10, which is designated as Plant 1. A status board 114 provides information about the various autonomous vehicles 22 in disparate material storage facilities 10, including Plant 1, a Plant 2, and a Plant 3. The first column 116 shows the number of autonomous vehicles 22 operating normally. The second column 118 shows the number of autonomous vehicles 22 in each material storage facility 10 that has a cautionary condition. The column 120 shows the number of autonomous vehicles 22 with error conditions. A message screen 122 provides a textual explanation 126 of the error condition, along with a time-stamp 124.

Figure 11:
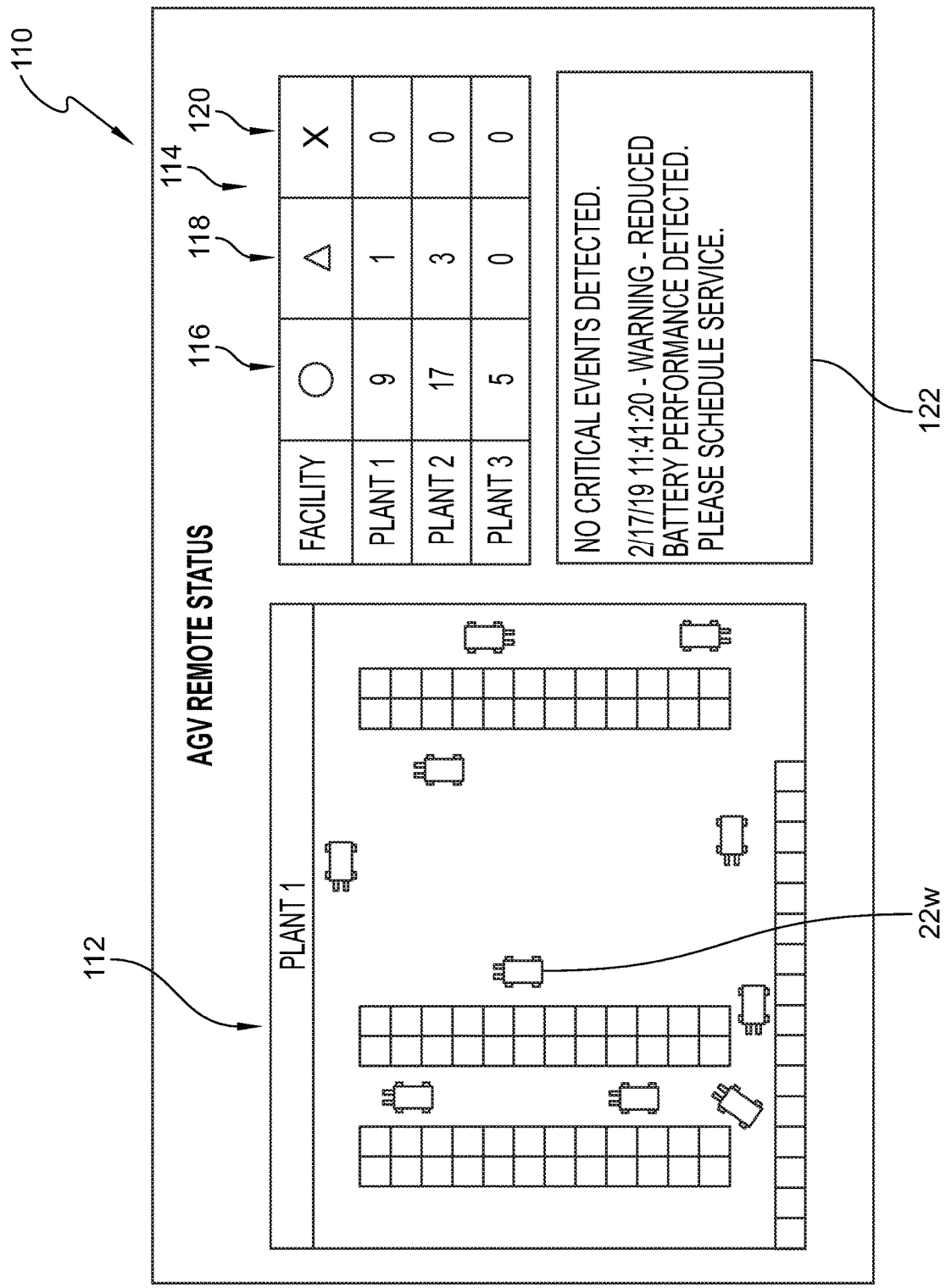
FIG. 11 is an example of a monitor screen of the remote monitoring station in normal operating conditions.

FIG. 11 is similar to FIG. 12, but shows that there are no error conditions. However, as shown in FIG. 11, an autonomous vehicle 22W is shown is highlighted to indicate a warning condition. The message screen 122 shows a message 130 with a time-stamp 132 that indicates that the autonomous vehicle 22W is having battery performance issues.

Figure 8:
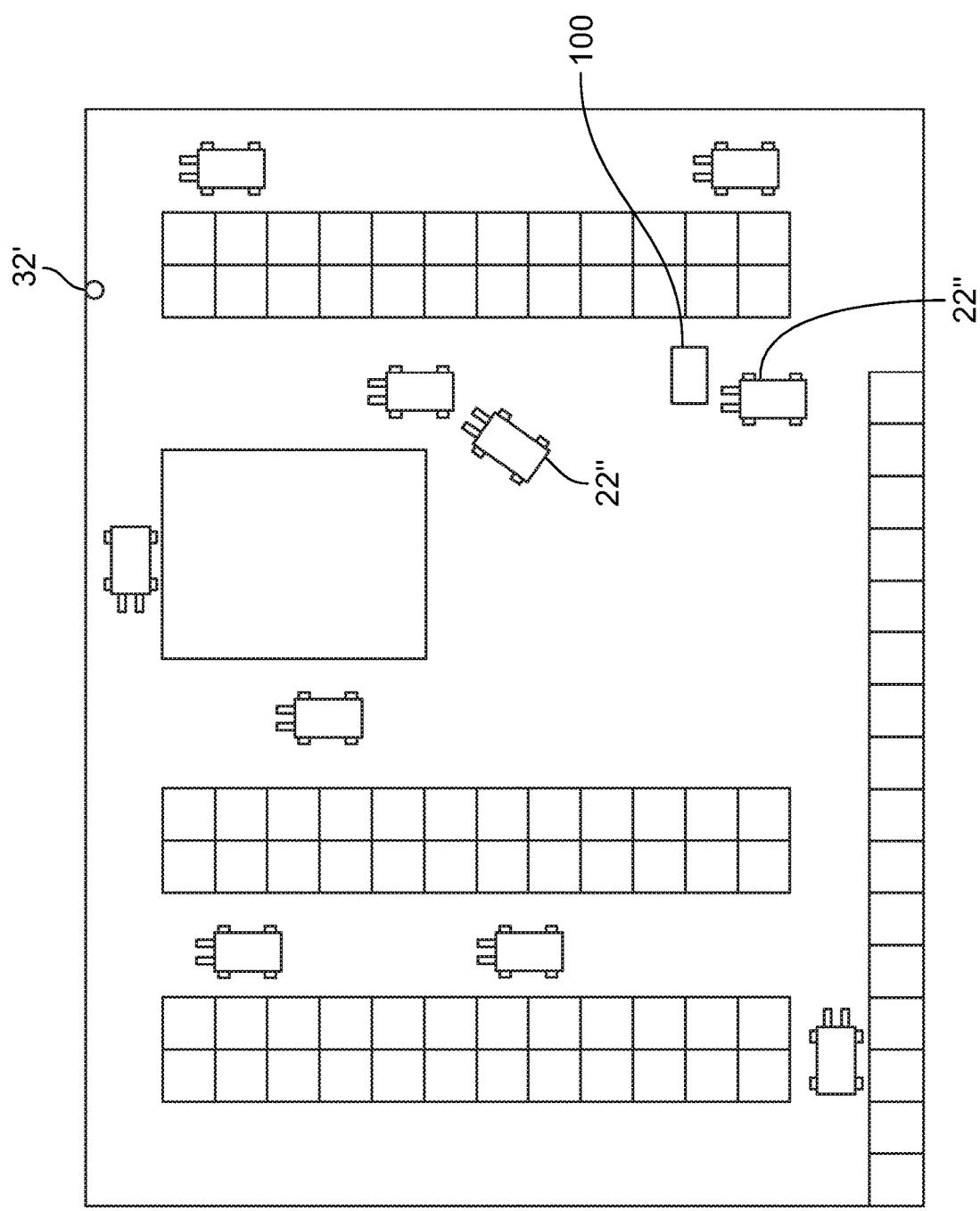
FIG. 8 is diagrammatic floor plan similar to FIG. 1, FIG. 8 showing an obstruction positioned in the path of an autonomous vehicle.

FIG. 8 shows that the error condition of FIG. 12 is caused by an obstruction/box 100 that has fallen in the path of the autonomous vehicle 22'. However, because the obstruction 100 is not shown in the field of view of the augmented display 72 as shown in FIG. 9, the operator may move the field of view by moving her head as shown in FIG. 10 to see the obstruction 100. At this point, the operator 8 will be able to use the functionality described above to pick different views to see the obstruction 100 from either camera 32' or from the perspective of autonomous vehicle 22" and make efforts to resolve the issue.

Figure 13:
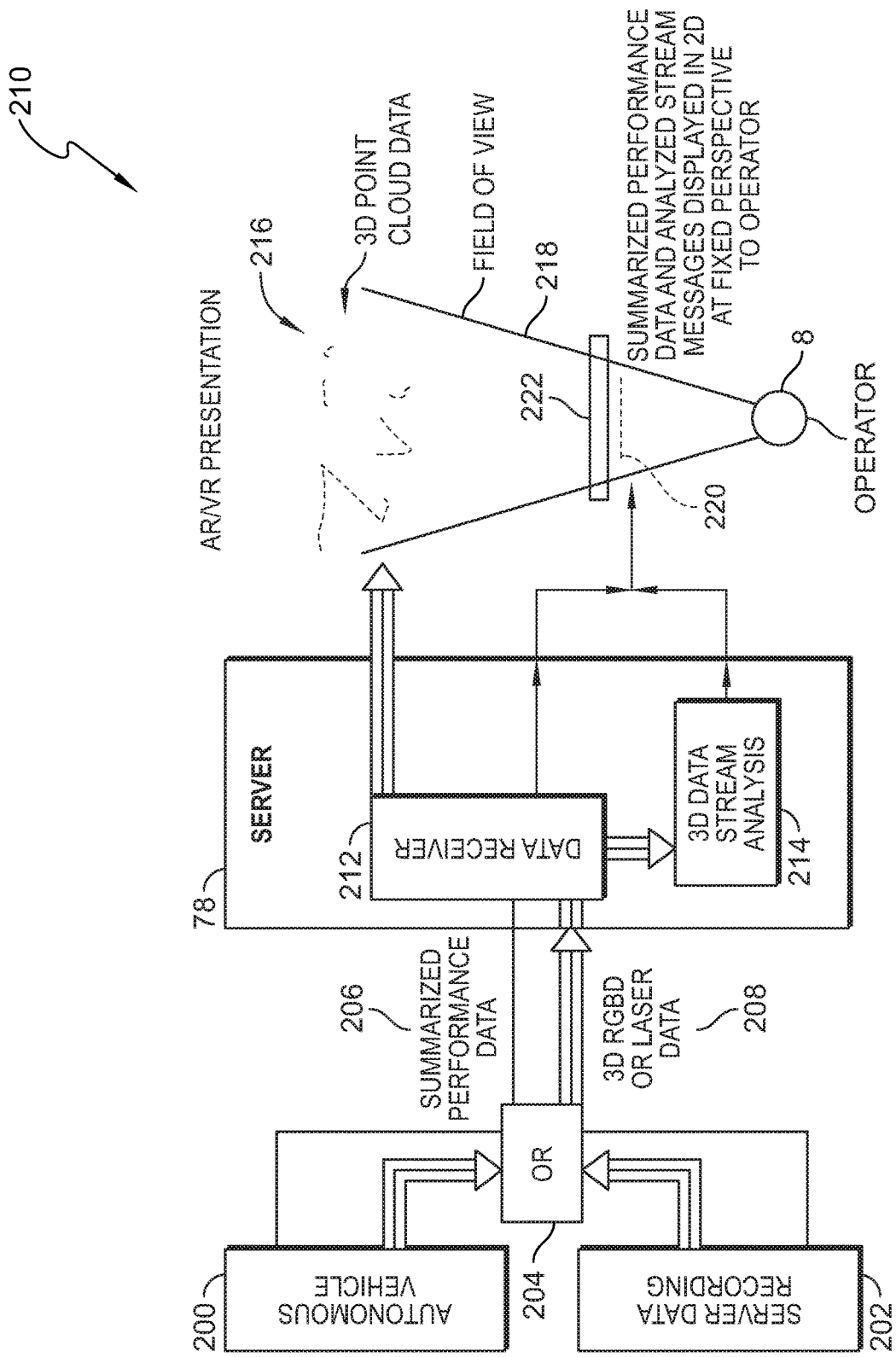
FIG. 13 is diagram of the data flow for creating the composite image of FIG. 7.

FIG. 13 illustrates the process 210 of development of the composite images seen by the operator 8 when using the augmented reality interface 64. The process 210 includes the use of data 200 from the autonomous vehicle 22 or data 202 stored on the server 78 which is chosen at the "or" step 204. Data 206 regarding the performance of the autonomous vehicle 22 is transferred to a data receiver 212 of the server 78. In addition, data 208 from various sensors 150 presented in the composite image is also provided to the data receiver 212. The three-dimensional data is used to generate a point cloud 216 of three-dimensional data within the operator's field of view 218. The point cloud 216 is generated to establish an image plane 222 that presents the three-dimensional data in a two-dimensions at the image plane 222. Additional data is provided through a three-dimensional data stream analysis 214 of the server 78 so that additional data 220 is presented at the image plane 222 in composite with the point cloud 216 so that a composite image including image data and representation of the data from the sensors 150 is presented at the image plane 222, providing the operator 8 the composite image discussed above.

Although this disclosure refers to specific embodiments, it will be understood by those skilled in the art that various changes in form and detail may be made without departing from the subject matter set forth in the accompanying claims.

The invention claimed is:

1. An autonomous vehicle tracking system comprising
  (i) at least one autonomous vehicle including a control system, the control system including
    a drive system providing power for the autonomous vehicle, the drive system operable to move the autonomous vehicle and to operate accessories of the autonomous vehicle,
    a plurality of sensors providing signals indicative of real-time information regarding the location and operation of the autonomous vehicle,
    a camera system providing a signal representative of images of the environment surrounding the autonomous vehicle,
    a controller including a processor and a memory device, the memory device including instructions that, when executed by the processor, cause the processor to receive signals from the sensors and the camera system, aggregate the signals to create an array of data that is a composite of the sensor signals and the camera signals that represents a time-sequenced composite image file that superimposes data derived from the sensor signals onto the images from the camera system,
  (ii) a centralized monitoring station including
    a computer in communication with the controller of the at least one autonomous vehicle, the computer including a processor and a memory device,
    a user input device in communication with the computer,
    a display device, in communication with the computer,
    wherein the memory device of the computer includes instructions that, when executed by the processor, cause the processor to process inputs from the user input device to communicate with the controller of the autonomous vehicle to prompt the controller transmit portions of the time-sequenced composite image file under the control of the user input device, the transmitted image file being received by the computer and displayed by the display device,
    wherein the time-sequenced composite image file is transmitted in real time and the portion transmitted varies based on the user input to generate a field of view perceptible to a human, wherein the display device comprises a head set and the user input device is coupled to the headset such that movement of the head set changes the portion of the image file transmitted responsive to movement of the headset to change the field of view being displayed by the head set, further comprising a plurality of autonomous vehicles, the computer in communication with the controller of each of the autonomous vehicles such that a user may select any of the plurality of autonomous vehicles and view the surroundings of the particular autonomous vehicle using the user input device and the head set, wherein the centralized monitoring station is operable to provide mission tasks to each of the plurality of autonomous vehicles, the centralized monitoring system including a monitor that provides current status of each of the plurality of autonomous vehicles, further comprising a plurality of cameras positioned in the working environment of the plurality of autonomous vehicles, the cameras providing a signal representative of images of portions of the working environment of the plurality of vehicles, the cameras including memory to store an array of data that represents a time-sequenced image file for the field of view of the particular camera, and wherein the computer is operable to transmit a signal to each of the autonomous vehicles and cameras to simultaneously change the point of time that the time-sequenced images are presented such that an operator may toggle between the views of each of the autonomous vehicles and each of the cameras at a coordinated point in time, the portion of the image file being transmitted by each autonomous vehicle being responsive to the position of the head set of the user.

2. The autonomous vehicle system of claim 1, wherein the position of the head set is calibrated from a particular datum in the environment of the plurality of autonomous vehicles.

3. The autonomous vehicle system of claim 1, wherein the position of the head set is calibrated from a neutral position relative to the particular camera or autonomous vehicle.

4. The autonomous vehicle system of claim 1, wherein each of the plurality of autonomous vehicles is operable to transmit an alert condition to the centralized monitoring station, the alert condition prompting the alert to be logged to the particular real time of the alert, and wherein the computer is operable to mark the point in time such that a user may choose the time of the alert to view the images from the cameras or autonomous vehicles.

5. The autonomous vehicle system of claim 1, wherein the user input device includes an input for varying the point in time which corresponds to the portion of the image file being transmitted, such that a user may choose to view the portion of the image file as it existed a different time from current real-time.

6. The autonomous vehicle system of claim 1, wherein the portion of the image file transmitted is responsive to the position of the head set, such that the user may vary the field of view at the different time to view the surroundings of the autonomous vehicle at that point in time.

7. The autonomous vehicle system of claim 1, wherein the time sequence may be paused such that a user may look around the autonomous vehicle at a single point in time by moving the head set to change the field of view.

8. An autonomous vehicle tracking system comprising a plurality of autonomous vehicles, each of the plurality of autonomous vehicles comprising a control system, the control system including a plurality of sensors providing signals indicative of real-time information regarding the location and operation of the autonomous vehicle, and a camera system providing a signal representative of images of the environment surrounding the autonomous vehicle, and a controller including a processor and a memory device, the memory device including instructions that, when executed by the processor, cause the processor to receive signals from the sensors and the camera system, aggregate the signals to create an array of data that is a composite of the sensor signals and the camera signals that represents a time-sequenced composite image file that superimposes data derived from the sensor signals onto the images from the camera system, a plurality of cameras positioned in the working environment of the plurality of autonomous vehicles, the cameras providing a signal representative of images of portions of the working environment of the plurality of autonomous vehicles, the cameras including memory to store an array of data that represents a time-sequenced image file for the field of view of the particular camera, and a centralized monitoring station including a user input device, an operator head set, and a computer in communication with the user input device and operator head set, the computer operable to transmit a signal to each of the autonomous vehicles and cameras to simultaneously change the point of time that the time-sequenced images are presented such that an operator may toggle between the views of each of the autonomous vehicles and each of the cameras at a coordinated point in time, the portion of the image file being transmitted by each autonomous vehicle being responsive to the position of the operator head set.

9. The autonomous vehicle system of claim 8, wherein the centralized monitoring station is operable to provide mission tasks to each of the plurality of autonomous vehicles, the centralized monitoring system including a monitor that provides current status of each of the plurality of autonomous vehicles.

10. The autonomous vehicle system of claim 8, wherein the time-sequenced composite image file is transmitted in real time and the portion transmitted varies based on the user input to generate a field of view perceptible to a human.

11. The autonomous vehicle system of claim 8, wherein the portion of the image file transmitted is responsive to the position of the head set, such that the user may vary the field of view at the different time to view the surroundings of the autonomous vehicle at that point in time.

12. The autonomous vehicle system of claim 8, wherein the time sequence may be paused such that a user may look around the autonomous vehicle at a single point in time by moving the head set to change the field of view.

13. The autonomous vehicle system of claim 8, wherein the computer is in communication with the controller of each of the autonomous vehicles such that a user may select any of the plurality of autonomous vehicles and view the surroundings of the particular autonomous vehicle using the user input device and the head set.

14. The autonomous vehicle system of claim 8, wherein the position of the head set is calibrated from a particular datum in the environment of the plurality of autonomous vehicles.

15. The autonomous vehicle system of claim 8, wherein the position of the head set is calibrated from a neutral position relative to the particular camera or autonomous vehicle.

16. The autonomous vehicle system of claim 8, wherein each of the plurality of autonomous vehicles is operable to transmit an alert condition to the centralized monitoring station, the alert condition prompting the alert to be logged to the particular real time of the alert, and wherein the computer is operable to mark the point in time such that a user may choose the time of the alert to view the images from the cameras or autonomous vehicles.

17. An autonomous vehicle management system comprising
a plurality of autonomous vehicles, each autonomous vehicle including
a vehicle camera system, and
a controller including a processor and a memory device, the memory device including instructions that, when executed by the processor, cause the processor to receive signals from the vehicle camera system, aggregate the signals to create an array of data that is a represents a time-sequenced image file from the vehicle camera system,
an environmental camera system providing signal representative of images of the environment surrounding the plurality of autonomous vehicles, the environmental cameras including memory to store an array of data that represents a time-sequenced image file for the field of view of the particular camera, and
a centralized monitoring station including
a computer in communication with the controller each autonomous vehicle, the computer including a processor and a memory device,
a user input device in communication with the computer,
a head set, in communication with the computer,
wherein the memory device of the computer includes instructions that, when executed by the processor, cause the processor to process inputs from the user input device to communicate with the controller of the autonomous vehicle to prompt the controller transmit portions of the time-sequenced image file under the control of the user input device, the transmitted image file being received by the computer and displayed by the head set, transmit a signal to each of the autonomous vehicles and environmental cameras to simultaneously change the point of time that the time-sequenced images are presented such that an operator may toggle between the views of each of the autonomous vehicles and each of the environmental cameras at a coordinated point in time, the portion of the image file being transmitted by each autonomous vehicle being responsive to the position of the operator head set.

18. The autonomous vehicle system of claim 17, wherein each of the plurality of autonomous vehicles is operable to transmit an alert condition to the centralized monitoring station, the alert condition prompting the alert to be logged to the particular real time of the alert, and wherein the computer is operable to mark the point in time such that a user may choose the time of the alert to view the images from the cameras or autonomous vehicles.

19. The autonomous vehicle system of claim 17, wherein the user input device includes an input for varying the point in time which corresponds to the portion of the image file being transmitted, such that a user may choose to view the portion of the image file as it existed a different time from current real-time.

20. The autonomous vehicle system of claim 17, wherein the portion of the image file transmitted is responsive to the position of the head set, such that the user may vary the field of view at the different time to view the surroundings of the autonomous vehicle at that point in time.

* * * * *